3,086,907
METHOD FOR CONTROLLING SOIL NEMATODES
Frederick A. Hessel, Montclair, N.J., assignor to General Aniline & Film Corporation, New York, N.Y., a corporation of Delaware
No Drawing. Filed Mar. 6, 1958, Ser. No. 719,520
3 Claims. (Cl. 167—33)

The present invention relates to an improved method of protecting chlorophyllaceous plant materials subject to attack by soil nematodes.

Practically all of the nematocides now in general use are toxic to humans and to various plant species. The two nematocides widely employed in the control and eradication of soil nematodes are DD (a mixture of 1,3-dichloropropylene and 1,2-dichloropropane) and ethylene dibromide. Both of these emit vapors, breathing of which is dangerous to health and if spilled on the skin will cause irritation. As far as toxicity to plants is concerned, this is so pronounced that manufacturers recommend that they be diffused out of the soil before a crop is planted.

It is an object of the present invention to provide an improved method of protecting chlorophyllaceous plant materials subject to attack by nematodes by treating the soil with certain species of five-membered heterocyclic lactones and lactams which are relatively non-toxic to plants and to humans.

Other objects and advantages will become more clearly manifest from the following description.

I have found that compounds having the following general formula:

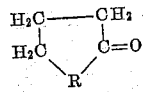

wherein R represents either oxygen or an imino (NH) group completely miscible with water, are very effective nematocides. The compounds are completely miscible with water and as a consequence are readily dispersed in soil solution and do not require diffusion prior to crop planting. In addition, the compounds are neither primary irritants nor skin sensitizers and as a consequence the mammalian toxicity is directly opposite to the compounds now employed. In addition, the products which are all colorless liquids can be used readily without the need of special handling precautions. In view of their complete miscibility in water, they can be diluted for immediate use either in the field or greenhouse.

The compounds contemplated by the foregoing general formula are γ-butyrolactone (boiling point 204° C.) and 2-pyrrolidone (boiling point 245° C.). When both of these compounds are employed in concentrated form they have the unusual and unexpected tendency to suppress the growth of emerging seedlings, but when employed in concentrations in less than 0.1% they appear to have little or no phytotoxic properties, with the exception of some broad leaved weeds, while retaining their property to protect root systems of all chlorophyllaceous plants against attack and damage caused by soil nematodes.

The amount of either γ-butyrolactone or 2-pyrrolidone that may be employed in the control and eradication of soil nematodes is not critical and the actual amount to be employed, depending upon whether the application is to be made in the field, greenhouse, flats or pots, is readily determined by routine experiments. For open fields, from 40 to 60 lbs. per acre of either the γ-butyrolactone or 2-pyrrolidone may be used either in concentrated form or diluted with 50 to 500 lbs. of water. As little as 0.1% by weight of the γ-butyrolactone or 2-pyrrolidone in aqueous solution may be sufficient to control soil nematodes.

The following examples will illustrate the manner in which the γ-butyrolactone and the 2-pyrrolidone may be employed in the control and eradication of soil nematodes. All parts given are percent by weight.

EXAMPLE I

This example illustrates the phytotoxicity spray test on two-week old seedlings:

| Compound | Percent | Bean | Tomato | Corn |
|---|---|---|---|---|
| | | Growth Suppression | | |
| 2-pyrrolidone | 0.1 | none | none | none. |
| γ-butyrolactone | 0.1 | none | none | none. |
| blank | | none | none | none. |

EXAMPLE II

In order to determine the systemic toxicity, the following evaluation method by soil application was employed:

Test plants: Wheat, soybeans, and a weed seed mixture.
Age of plants: Seedlings; when soybeans are developing second trifoliate leaves.
Container: Grown in 4″ clay pots.
Planting method: Plant 5 soybeans and 15 wheat seeds of each species at the time to give fine uniform plants of each species at the time of treatment. Scatter ¼ teaspoon of weed seed mixture on soil surface after planting.
Formulation of chemical: Apply 45 ml. of a 0.1% solution to the surface of one 4″ pot (50 lbs. per acre).
Environment control: Standard greenhouse conditions; water as needed.
Duration of test: About three weeks.

TEST

| Product | Percent | Crop | | Weeds | |
|---|---|---|---|---|---|
| | | Wheat | Soybean | Grasses | Broad-leaved |
| | | Growth Suppression | | | |
| 2-pyrrolidone | 0.1 | slight | moderate | slight | severe. |
| γ-butyrolactone | 0.1 | none | slight | slight | slight. |
| blank | | none | none | none | none. |

EXAMPLE III

The following example illustrates the results of the nematocide screening test. In the method employed, duplicate 100 gram samples of dry sand were mixed with 5 gram samples of a brei of tomato roots infested with root-knot nematodes, Meloidogyne incognita. The brei was prepared by cutting tomato roots of infested plants into quarter inch lengths, then further macerating in a Waring Blendor for 1 minute. The sand and the brei were mechanically mixed by shaking 1 minute in a closed Mason jar. The mixture was transferred to 2½ inch clay pots at which time 50 mg. of test chemical was added to the mixture. Each pot was then wrapped in Saran and allowed to stand for 24 hours.

The mixture was then transferred to stainless steel cylinder screens, approximately 2½ inches high and 3½ inches in diameter. The screen material was 100 mesh stainless steel wire cloth. These screens were placed in the bottom half of a 9 cm. Petri dish containing 25 ml. of water and covered with the Petri dish cover. In a short time an additional 10 ml. of distilled water were added to each plate in order that free water would be available in the dish. After 24 hours microscopic counts of ten fields were made of the living nematodes which had migrated through the screen and into the Petri dish. Comparisons were made with untreated control dishes.

| Compound | Rate in Milligrams | Fields Examined | Average Nematode Count Living | Average Nematode Count Dead |
|---|---|---|---|---|
| γ-butyrolactone | 50 | 10 | 19 | 131 |
| 2-pyrrolidone | 50 | 10 | 42 | 109 |
| blank | | 10 | 151 | 0 |

EXAMPLE IV

Nematocide Plant Test

A quantity of sandy loam was contaminated with chopped tomato roots containing *Meloidogyne incognita*. After thoroughly mixing the potted medium to insure an even distribution of inoculum, the soil was placed in pint Mason jars and the appropriate amount of each chemical was introduced into each jar, after which the jars were stored at room temperature overnight. The soil was then introduced in a 4″ clay pot. Seeds of *Cucumis sativus* variety Market Canner's were planted and the pots placed in a greenhouse and watered regularly along with blanks. Approximately after 30–60 days after the original seedling, all plants were harvested and roots examined.

| Treatment | Dosage Rate | Observations |
|---|---|---|
| γ-butyrolactone | 50 milligrams per 100 grams of soil. | no galls (plants healthy, heavy root system). |
| 2-pyrrolidone | do | Do. |
| Blank | | 25 galls (plants, sickly looking, poor root system). |

For field applications, it is advisable that the γ-butyrolactone or the 2-pyrrolidone, either in concentrated form or in dilute solution, be applied when the soil temperature is anywhere between 40 to 80° F. Below 40° F. the movement of the γ-butyrolactone and 2-pyrrolidone in soil solution is generally too slow to give substantially satisfactory results. Application above 80° F. has no adverse effect in both the inhibition or destruction of soil nematodes.

From numerous field tests, I have found that 1 pint of concentrated γ-butyrolactone or 2-pyrrolidone covers from 150 to 175 lineal feet of furrow.

Satisfactory results in the control of cyst-forming nematodes, endoparasitic nematodes, ectoparasitic nematodes and background feeders such as *Aphelenchoides ritzemabosi* have been obtained on the following vegetables and small fruits:

Asparagus
Bean, Lima
Bean, snap
Broccoli
Brussels sprout
Cabbage
Cantaloupe
Carrot
Cauliflower
Celery
Corn, sweet
Cucumber
Eggplant
Lettuce
Okra
Parsnip
Pea
Radish
Spinach
Squash
Strawberry
Tomato
Turnip
Watermelon The unique property of both γ-butyrolactone and 2-pyrrolidone as soil fumigants is their lack of toxicity when applied to the soil in which many plants are growing. In view thereof, they can be used for pre-plant soil treatment. In addition, they give long lasting control of cyst-forming nematodes, root-forming nematodes and nematodes that enter root tissues.

I claim:

1. A process of controlling and eradicating nematodes from nematode infested soil which comprises introducing to the soil a nematocidal amount of a nematocide having the following general formula:

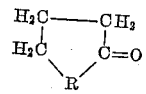

wherein R represents a member selected from the class consisting of oxygen and imino group.

2. The process according to claim 1 wherein the nematocide is γ-butyrolactone.

3. The process according to claim 1 wherein the nematocide is 2-pyrrolidone.

References Cited in the file of this patent

UNITED STATES PATENTS

| | | |
|---|---|---|
| 1,982,909 | Flint | Dec. 4, 1934 |
| 2,057,044 | Meisenburg | Oct. 13, 1936 |
| 2,377,446 | Payne | June 5, 1945 |
| 2,419,073 | Hammer | Apr. 15, 1947 |
| 2,435,204 | Davidson | Feb. 3, 1948 |
| 2,473,984 | Bickerton | June 21, 1949 |
| 2,502,244 | Carter | Mar. 28, 1950 |
| 2,530,348 | Britton et al. | Nov. 14, 1950 |
| 2,543,580 | Kay | Feb. 27, 1951 |
| 2,714,619 | Anderegg et al. | Aug. 2, 1955 |
| 2,726,485 | Thomas | Dec. 13, 1955 |
| 2,730,547 | Dye | Jan. 10, 1956 |
| 2,743,209 | Jones | Apr. 24, 1956 |
| 2,770,638 | Giolito | Nov. 13, 1956 |
| 2,779,680 | Wolf | Jan. 29, 1957 |
| 2,794,727 | Barrows | June 4, 1957 |
| 2,802,021 | Heininger | Aug. 6, 1957 |
| 2,802,818 | Wheeler | Aug. 13, 1957 |

OTHER REFERENCES

Paranjape et al.: J. Univ. Bombay, vol XI, part 5, pp. 104–110, March 1943.

Frear, A.: Catalogue of Insecticides and Fungicides, vol. 1, p. 102, 1947.

Haynes: Quarterly Reviews, vol. II, pp. 46–72, 1948, pp. 670–72 particularly relied on.